(12) United States Patent  
Asserhall

(10) Patent No.: US 11,650,821 B1  
(45) Date of Patent: May 16, 2023

(54) BRANCH STALL ELIMINATION IN PIPELINED MICROPROCESSORS

(71) Applicant: Xilinx, Inc., San Jose, CA (US)

(72) Inventor: Stefan Asserhall, Gothenburg (SE)

(73) Assignee: Xilinx, Inc., San Jose, CA (US)

( * ) Notice: Subject to any disclaimer, the term of this patent is extended or adjusted under 35 U.S.C. 154(b) by 46 days.

(21) Appl. No.: 17/324,163

(22) Filed: May 19, 2021

(51) Int. Cl.
  *G06F 9/30* (2018.01)
  *G06F 9/38* (2018.01)
  *G06F 9/54* (2006.01)
  *G06F 9/32* (2018.01)

(52) U.S. Cl.
  CPC .......... *G06F 9/381* (2013.01); *G06F 9/30079* (2013.01); *G06F 9/321* (2013.01); *G06F 9/3802* (2013.01); *G06F 9/546* (2013.01)

(58) Field of Classification Search
  CPC .... G06F 9/381; G06F 9/3802; G06F 9/30079; G06F 9/546
  See application file for complete search history.

(56) References Cited

U.S. PATENT DOCUMENTS

| | | | | | |
|---|---|---|---|---|---|
| 5,473,764 | A | * | 12/1995 | Chi | G06F 9/3802 |
| | | | | | 711/E12.021 |
| 5,701,435 | A | * | 12/1997 | Chi | G06F 9/3808 |
| | | | | | 711/125 |
| 2004/0193858 | A1 | * | 9/2004 | Ahmad | G06F 9/325 |
| | | | | | 712/241 |
| 2006/0218385 | A1 | | 9/2006 | Smith et al. | |
| 2009/0217017 | A1 | * | 8/2009 | Alexander | G06F 9/3814 |
| | | | | | 712/241 |
| 2015/0212820 | A1 | * | 7/2015 | Wiencke | G06F 9/381 |
| | | | | | 712/241 |

OTHER PUBLICATIONS

Branch target predictor—Wikipedia, https://en.wikipedia.org/wiki/Branch_target_predictor#BTB, 2 pages.
Delay slot—Wikipedia, https://en.wikipedia.org/wiki/Delay_slot, 3 pages.
Andrew Waterman, et al., The RISC-V Instruction Set Manual vol. 1: User-Level ISA Document Version 2.2, CS Division, EECS Department, University of California, Berkeley, May 7, 2017, 145 pages.

* cited by examiner

*Primary Examiner* — Corey S Faherty
(74) *Attorney, Agent, or Firm* — Kevin T. Cuenot

(57) ABSTRACT

A system can include a microprocessor having a prefetch queue including a plurality of slots configured to store program counter values (PCVs) and instructions, a pipeline configured to receive instructions from the prefetch queue, and a select circuit coupled to the prefetch queue. The select circuit may selectively freeze a first slot of the plurality of slots and selectively output a frozen PCV and a frozen instruction from the first slot while frozen. The microprocessor can include write logic coupled to the prefetch queue and a comparator circuit coupled to the prefetch queue and the select circuit. The write logic may load data into unfrozen slots of the prefetch queue. The comparator circuit may compare a target PCV with the frozen PCV to determine a match. The select circuit indicates, to the pipeline, whether the frozen instruction is valid based on the comparing.

20 Claims, 5 Drawing Sheets

BRANCH STALL ELIMINATION IN PIPELINED MICROPROCESSORS

TECHNICAL FIELD

This disclosure relates to integrated circuits (ICs) and, more particularly, to elimination of branch stalls in pipelined microprocessors.

BACKGROUND

Microprocessors that utilize a Reduced Instruction Set Computer (RISC) architecture are characterized by execution of assembly language instructions that require one clock cycle per instruction. RISC microprocessors are also characterized by features such as having a larger number of registers compared to their Complex Instruction Set Computer (CISC) counterparts and the use of pipelining to facilitate simultaneous execution of instructions through a plurality of stages of pipeline circuitry.

RISC-V is an Instruction Set Architecture (ISA) for RISC microprocessors that does not provide jumps or branches with architecturally visible delay slots. A delay slot refers to an instruction slot within certain RISC and Digital Signal Processing (DSP) microprocessor architectures that is executed without the effects of a preceding instruction. An example of a delay slot is a single instruction located immediately after a branch or jump instruction that, in consequence of code reordering by the assembler, typically executes prior to the branch or jump instruction being executed. For example, a program instruction that is not dependent on the result of a branch or jump instruction may be executed in a delay slot while the branch or jump is taken as opposed to introducing a stall.

In many prior RISC microprocessor implementations, one or more delay slots were implemented to reduce pipeline stalls from branches and jumps. The RISC-V ISA omits delay slots to avoid complicating higher performance RISC-V based microprocessor implementations.

SUMMARY

In an example implementation, a system can include a microprocessor. The microprocessor can include a prefetch queue including a plurality of slots. The plurality of slots are configured to store program counter values and instructions. The microprocessor can include a pipeline configured to receive instructions from the prefetch queue. The microprocessor can include a select circuit coupled to the prefetch queue. The select circuit may be configured to selectively freeze a first slot of the plurality of slots and selectively output a frozen program counter value and a frozen instruction from the first slot while frozen. The microprocessor can include write logic coupled to the prefetch queue. The write logic may be configured to load program counter values and instructions into unfrozen slots of the prefetch queue. The microprocessor can include a comparator circuit coupled to the prefetch queue and the select circuit. The comparator circuit may be configured to compare a target program counter value with the frozen program counter value to determine a match. The select circuit indicates, to the pipeline, whether the frozen instruction is valid based on whether the target program counter value matches the frozen program counter value.

In another example implementation, a method can include freezing a first slot of a plurality of slots of a prefetch queue in response to detecting entry of a first control instruction into a pipeline of a microprocessor. The method can include outputting a frozen program counter value and a frozen instruction from the first slot while frozen in response to detecting entry of a second control instruction into the pipeline. The method can include comparing the frozen program counter value with a target program counter value using a comparator circuit to determine a match and providing the frozen instruction to the pipeline. The method can include indicating to the pipeline that the frozen instruction is valid in response to determining that the frozen instruction matches the target program counter value.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
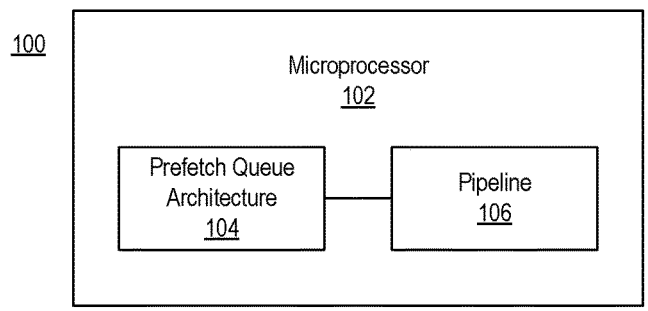
FIG. 1 illustrates an example system including a microprocessor for use with the inventive arrangements described within this disclosure.

This disclosure relates to integrated circuits (ICs) and, more particularly, to elimination of branch stalls in pipelined microprocessors. A pipelined microprocessor uses a technique referred to as "instruction pipelining" for implementing instruction-level parallelism within the microprocessor. The microprocessor includes circuitry referred to as a "pipeline" having a plurality of sequential stages. In general, each stage of the pipeline may be responsible for performing a particular step or steps of instruction execution. For example, stages of a pipeline of a microprocessor may include instruction fetch, decode, execution, and write back. The number of stages of the pipeline of a microprocessor may vary depending on the complexity of the pipelining used.

Parallelism is achieved using instruction pipelining in that the microprocessor operates on multiple instructions concurrently in the different pipeline stages. For example, a pipeline having four stages allows a microprocessor to perform the following operations concurrently (e.g., in parallel): in the first stage an instruction is fetched, in the second stage a different instruction having already been processed through the first stage is decoded (e.g., operands are fetched), in the third stage yet a different instruction is executed having already been processed through the first and second stages, and in the fourth stage results are written for yet another instruction having already been processed through the first, second, and third stages.

Using pipelining, a microprocessor with a RISC architecture is capable of executing one instruction each clock cycle. Within some RISC processors that use a single-issue pipeline, the absence of delay slots, as proposed in the RISC-V ISA, can degrade performance of the microprocessor due to the occurrence of pipeline stalls. The term "single-issue pipeline" means a microprocessor architecture that uses a single pipeline. A single-issue pipeline is to be contrasted with other microprocessor architectures that use two or more pipelines in parallel, where each such pipeline can be used to process multiple instructions in parallel or different and alternative sequences of instructions.

One technique for addressing pipeline stalls in a RISC microprocessor having a single-issue pipeline architecture is to introduce a Branch Target Cache (BTC). While the BTC may avoid pipeline stalls, implementing a BTC requires a significant amount of circuit resources. The use of a BTC may also negatively affect the maximum achievable operating frequency of the microprocessor.

In accordance with the inventive arrangements described within this disclosure, a prefetch queue may be utilized to avoid pipeline stalls in a RISC-based, single-issue pipeline microprocessor. The prefetch queue is part of a circuit architecture that is already available in such microprocessors. The existing prefetch queue architecture may be modified to operate in a manner that is capable of eliminating pipeline stalls. Modifying the existing prefetch queue as described herein uses fewer additional circuit resources compared to implementing a BTC. Using a prefetch queue as described herein, a RISC-based, single-issue pipeline microprocessor is able to avoid situations where the next instruction for a pipeline following a control instruction is not available in the prefetch queue, thereby inducing a stall in the pipeline.

As defined within this disclosure, a control instruction is an instruction that causes a change in the sequence of instructions executed by a microprocessor such that the microprocessor executes a first instruction followed by a second instruction, in consequence of the control instruction, where the program counter value of the second instruction is non-sequential with the program counter value of the first instruction. Examples of control instructions include a jump instruction and a branch instruction.

FIG. 1 illustrates an example system 100 including a microprocessor 102 for use with the inventive arrangements described within this disclosure. System 100 may include, or be implemented as, an IC. In the example of FIG. 1, the IC is implemented as microprocessor 102. For example, microprocessor 102 may be implemented as a standalone IC without other circuits and/or subsystems.

In another aspect, microprocessor 102 may be embedded within an IC along with one or more other components and/or subsystems forming system 100. For example, microprocessor 102 may be included in an IC that includes other Application Specific ICs (ASICs) or hardwired circuit blocks, programmable circuitry, or any combination thereof. An example of an IC with an embedded microprocessor includes a Field Programmable Gate Array (FPGA) having one or more microprocessors therein or a System-on-Chip including one or more microprocessors therein.

Microprocessor 102 includes a prefetch queue architecture (PQ architecture) 104 and a pipeline 106. Microprocessor 102 may be implemented as a RISC microprocessor. Further, microprocessor 102 may be implemented as a single-issue pipeline microprocessor. In this regard, microprocessor 102 may include a single pipeline 106. In addition, microprocessor 102 may be implemented so as not to use delay slots. For example, microprocessor 102 may be implemented in accordance with the RISC-V ISA where no delay slots are visible.

Pipeline 106 may include a plurality of different stages. For purposes of illustration, the stages of pipeline 106 may include, but are not limited to, fetch, decode, execute, and write back. Pipeline 106 may include fewer or more stages depending on the particular implementation of pipeline 106 and microprocessor 102.

PQ architecture 104 is configured to fetch instructions from a memory (not shown) in advance of the instructions being executed and store the fetched instructions in a prefetch queue. PQ architecture 104 is configured to feed those prefetched instructions stored in the prefetch queue to pipeline 106. In general, PQ architecture 104 fetches instructions, in sequence, from a particular location in memory and loads the fetched instructions into the prefetch queue of PQ architecture 104. The PQ architecture 104 may continue to fetch sequential instructions during operation. The instructions may be continually provided from the prefetch queue to pipeline 106 in sequence. When a control instruction is encountered by pipeline 106, the sequence of instructions needed for execution deviates from the sequentially ordered instructions that have been prefetched into the prefetch queue of PQ architecture 104.

In conventional single-issue pipeline microprocessors that operate without delay slots, the entire prefetch queue is cleared in response to encountering the control instruction since the instructions contained in the prefetch queue will not be executed. New sequential instructions are fetched into the prefetch queue, where the new sequential instructions start at the address to which program execution is branching or jumping, referred to herein as the "target program counter value" or "target address." The new sequential instructions are loaded into the prefetch queue.

Fetching new data into the prefetch queue requires at least one clock cycle to complete. As such, in a conventional RISC-based microprocessor having a single-issue pipeline that does not use delay slots, the time needed to fetch new data into the prefetch queue causes a pipeline stall. No new instructions are available to load into the pipeline until the new data is fetched into the prefetch queue.

As the conventional microprocessor continues to operate, newly fetched data overwrites existing data in the prefetch queue. No data from prior fetch operations is preserved. In cases where the microprocessor is executing a loop, each loop back to the target address may result in a further clearing of the prefetch queue and subsequent overwrite of all data therein. This means that upon each iteration of the loop, in this case, the microprocessor will suffer a pipeline stall in consequence of the lack of delay slots thereby inhibiting performance of the microprocessor.

In accordance with the inventive arrangements described within this disclosure, PQ architecture 104 is capable of freezing certain data in the prefetch queue in response to a control instruction entering pipeline 106. Upon detecting a further, or subsequent, control instruction entering pipeline 106, PQ architecture 104 may provide all or a portion of the frozen data to pipeline 106, as described hereinbelow, to avoid a pipeline stall. Concurrently with providing the frozen data, PQ architecture 104 fetches new data into portions of the prefetch queue that are not frozen. Such newly fetched data may then be fed into pipeline 106 in the next clock cycle and in subsequent clock cycles, while preserving the data in the frozen portion of the prefetch queue.

Figure 2:
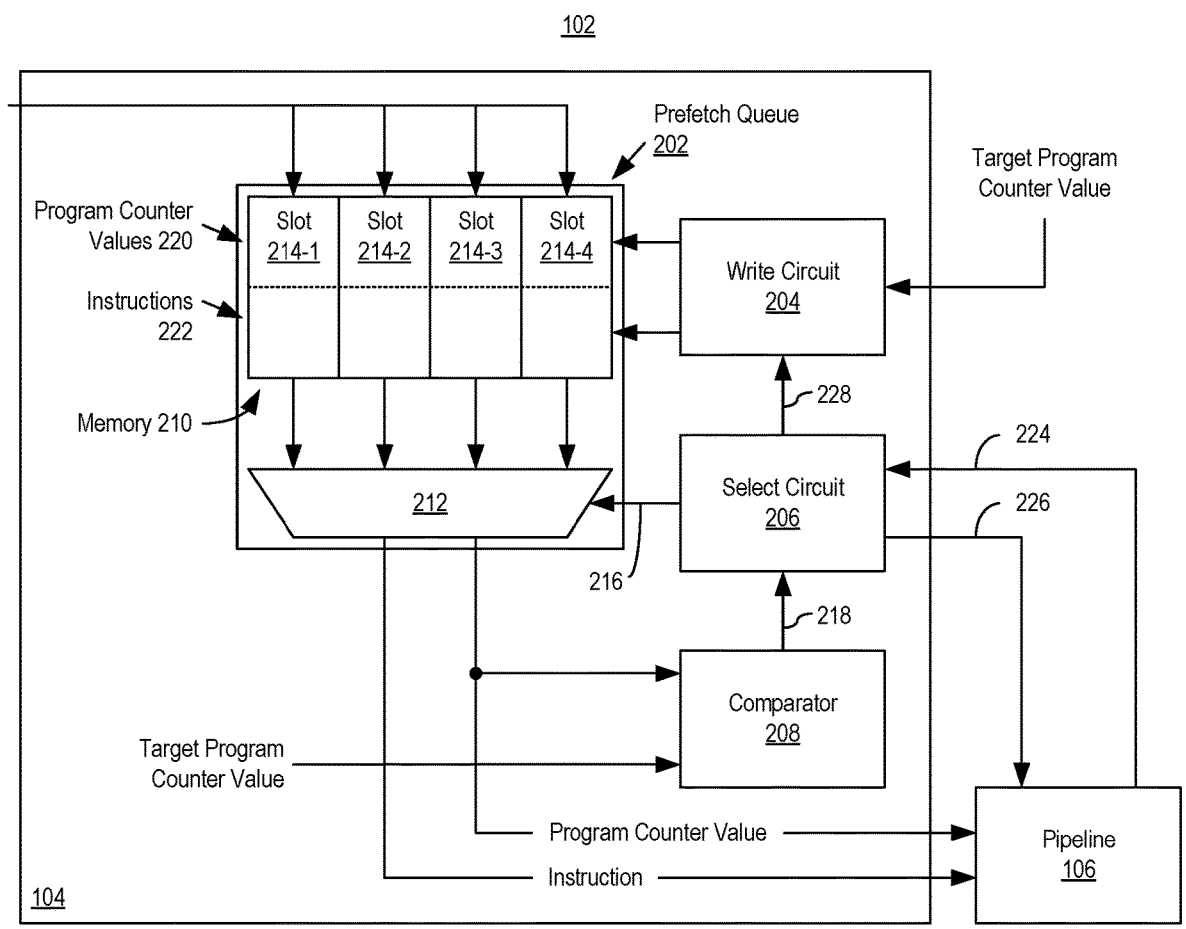
FIG. 2 illustrates an example implementation of the prefetch queue architecture of FIG. 1.

FIG. 2 illustrates an example implementation of PQ architecture 104 of FIG. 1. In the example of FIG. 2, PQ architecture 104 includes a prefetch queue 202, a write circuit 204, a select circuit 206, and a comparator circuit 208. Prefetch queue 202 includes a memory 210 and a multiplexer 212. Memory 210 is organized into a plurality of slots 214 (e.g., memory locations). For purposes of illustration, memory 210 is shown to include 4 slots. It should be appreciated that memory 210 may include fewer or more slots than shown. In an example implementation, memory 210 is organized as and operates as a circular buffer.

Slots 214 are capable of storing program counter values 220 and instructions 222. For example, each slot 214 is capable of storing a single program counter value and the instruction (e.g., opcode) located at the location in memory specified by that program counter value. Within this disclosure, the program counter value and instruction stored in the same slot may be referred to as "corresponding" to one another. Write circuit 204 is capable of fetching data, e.g., program counter values and corresponding instructions, and storing the fetched data within slots 214.

In general, PQ architecture 104 is capable of selectively freezing and unfreezing one or more of slots 214 in response to certain conditions described hereinbelow in greater detail. As defined within this disclosure, the term "freeze" or "frozen," as applied to a slot of the prefetch queue or data stored in a slot of a prefetch queue, means that the slot is in a state where the data stored in the slot may not be cleared or overwritten. To clear data from a frozen slot or write data to a frozen slot, the slot must first be unfrozen.

In one aspect, select circuit 206 is capable of performing the freezing and unfreezing of slots 214. As noted, memory 210 may be organized as a circular buffer where select circuit 206 implements the pointer circuitry necessary to track reads, writes, and frozen and/or unfrozen slots of memory 210. For example, select circuit 206 may include circuitry for tracking which of slots 214 is the "first" slot as new sequential data is fetched into memory 210. Select circuit 206 may communicate with write circuit 204 to indicate which of slots 214 are frozen or unfrozen as the case may be. Accordingly, select circuit 206 is also capable of providing a select signal 216 to multiplexer 212 to specify the particular slot 214 from which data is output from multiplexer 212 to pipeline 106 and/or to comparator circuit 208.

Write circuit 204 is capable of fetching data into memory 210 and writing the fetched data to slots 214. Write circuit 204 may only write fetched data to those slots 214 that are unfrozen. That is, write circuit 204 is unable to write to a frozen slot, where the state of the slot as being frozen is specified by select circuit 206.

Comparator circuit 208 is capable of receiving program counter values output from prefetch queue 202 and comparing the program counter values with a target program counter value. Comparator circuit 208 is capable of indicating, to select circuit 206, by way of signal 218, whether any given program counter value from multiplexer 212 matches the target program counter value. Further operative details relating to FIG. 2 are described below with reference to FIG. 3.

Figure 3:
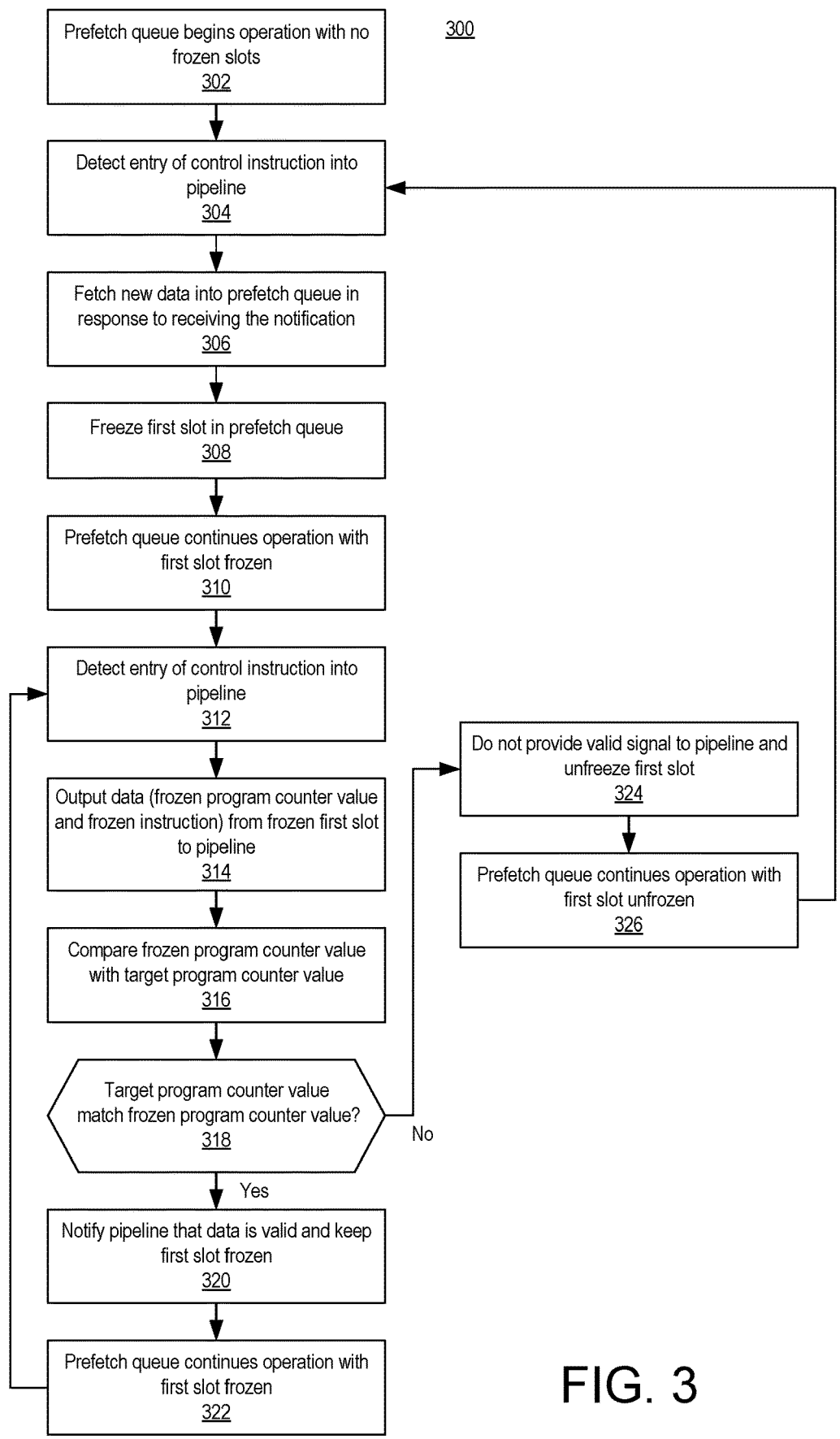
FIG. 3 is a method illustrating certain operative features of the prefetch queue architecture of FIGS. 1 and 2.

FIG. 3 illustrates a method 300 of operation for PQ architecture 104 of FIGS. 1 and 2. Referring to both FIGS. 2 and 3, in block 302, prefetch queue 202 begins operation with no frozen slots 214. For purposes of illustration, memory 210 includes N different slots 214, where N is an integer value greater than 1. PQ architecture 104 may operate such that write circuit 204 fetches enough data to fill the N slots 214 and writes the data to the N slots 214. That is, write circuit 204 fetches N pairs of program counter values 220 and instructions 222 and stores each program counter value and corresponding instruction as a "data pair" in a slot 214. The fetched data may be sequential in that write circuit 204 fetches the instructions from sequential addresses (e.g., program counter values) and stores the sequential data pairs in consecutive slots 214 (e.g., sequentially).

Figure 4A:
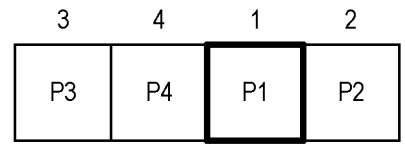
FIGS. 4A, 4B, 4C, 4D, 4E, and 4F illustrate examples of data fetched into slots of the memory of the prefetch queue.

FIGS. 4A, 4B, 4C, 4D, 4E, and 4F illustrate examples of data fetched into slots 214 of memory 210 of prefetch queue 202. In the examples of FIGS. 4A-4F, the "first" slot is shown in bold. Any slots that are frozen are shaded. FIG. 4A illustrates an example where the prefetch queue includes slots 1, 2, 3, and 4. FIG. 4A is illustrative of block 302 in that no slot is frozen. Slot 1 is loaded with a first data pair depicted as "P1" in the figure. Slots 2, 3, and 4 are loaded with data pairs P2, P3, and P4, respectively.

In block 304, entry of a control instruction into pipeline 106 may be detected. For example, select circuit 206 is capable of receiving a notification that a control instruction has entered pipeline 106. In response to a control instruction entering a particular stage of pipeline 106, pipeline 106 provides a notification to select circuit 206 by way of signal 224. In one aspect, the particular stage of pipeline 106 that triggers the notification may be the first stage of pipeline 106 (e.g., a fetch stage). That is, the notification may be triggered in response to the control instruction entering the first stage of pipeline 106. In another aspect, the particular stage of pipeline 106 that triggers the notification may be the decode stage of pipeline 106. In another aspect, the particular stage of pipeline 106 that triggers the notification may be the execute stage of pipeline 106. One or more of the noted stages, for example, may include circuitry that is capable of detecting a control instruction and/or determining that such instruction is valid and, in response, generating the notification. Select circuit 206, in response to being notified of the first control instruction entering pipeline 106, is capable of notifying write circuit 204 by way of signal 228. In another aspect, write circuit 204 may receive signal 224 (not shown) in addition to select circuit 206.

In block 306, write circuit 204 is capable of fetching new data into prefetch queue 202 in response to the notification that a control instruction is entering pipeline 106. In one aspect, the target address to which program execution will move (e.g., jump or branch) in consequence of the control instruction may be calculated by pipeline 106 and provided to PQ architecture 104 as the target program counter value. The target program counter value may be provided to comparator circuit 208 and, for example, to write circuit 204. Accordingly, in response to the notification of the control instruction, write circuit 204 fetches new data pairs starting at the target program counter value and writes the new data pairs into prefetch queue 202. That is, write circuit 204 fetches a N-sequential instructions (e.g., opcodes) starting from the target program counter value and loads target program counter values and corresponding instructions into the N slots 214. With no slots frozen, and N slots being available, write circuit 204 fetches enough sequential data pairs to fill each of the N slots of prefetch queue 202.

As discussed, with memory 210 being implemented as a circular buffer, select circuit 206 is capable of tracking which of slots 214 is the "first" slot. The "first slot" is the slot 214 of prefetch queue 202 that includes the first data pair of a sequence of such data pairs retrieved by write circuit 204 in the most recent fetch operation. Within this disclosure, only a first slot that stores the target program counter value in consequence of a control instruction may be frozen. Accordingly, in this example, the "first slot" is the slot 214 that stores the data pair that includes the target program counter value (e.g., as provided from pipeline 106).

In block 308, having detected a control instruction entering the pipeline and fetched new data into each of the N slots 214 of prefetch queue 202 (e.g., where no slot was frozen), the first slot 214 of prefetch queue 202 is frozen. Select circuit 206 is capable of freezing the first slot 214 of prefetch queue 202.

Figure 4B:
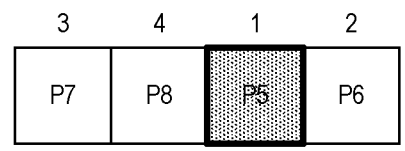

FIG. 4B illustrates an example state of memory 210 subsequent to block 308. In the example of FIG. 4B, slots 1, 2, 3, and 4 store new data as data pairs P5, P6, P7, and P8, respectively. In this example, data pair P5 is not sequential with data pair P4. That is, the program counter value of data pair P5 is not sequential with the program counter value of data pair P4. Slot 1, being the "first slot," is frozen where the frozen state of a slot is illustrated with shading.

In block 310, the prefetch queue continues operation with the first slot frozen. That is, select circuit 206, for example, may control multiplexer 212 to continue to output program counter values 220 and corresponding instructions 222 from slots 214 sequentially. Once the contents of the frozen first slot are output from multiplexer 212 one time, select circuit 206 does not output the contents of the frozen first slot again (e.g., while frozen) except in response to a detection of a further control instruction entering pipeline 106. That is, select circuit 206 will continue to iterate by outputting data from the unfrozen slots 214 (e.g., slots 2, 3, and 4). Concurrently, write circuit 204 will continue to fetch new sequential data as needed into slots 2, 3, and 4. While the first slot is frozen, however, as indicated by signal 228, write circuit fetches only enough data to fill N−1 slots 214 of prefetch queue 202. As data pairs are fetched by write circuit 204, the fetched data pairs are written to only the unfrozen slots 214 of prefetch queue 202 (e.g., to slots 2, 3, and 4).

Figure 4C:
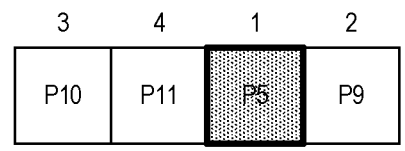

FIG. 4C illustrates an example state of memory 210 subsequent to block 310. In the example of FIG. 4C, the contents of the frozen first slot remain unchanged. Slot 1, for example, still stores data pair P5. The contents of unfrozen slots 2, 3, and 4 store new data in the form of data pairs P9, P10, and P11.

In block 312, entry of a control instruction into pipeline 106 again may be detected. For example, select circuit 206 receives a notification that a control instruction has entered pipeline 106. The control instruction detected in block 312 is the next control instruction to enter pipeline 106 following the control instruction of block 304. That is, no other intervening control instruction has entered pipeline 106 between blocks 304 and 312. In detecting a second control instruction entering pipeline 106 in block 312, unlike in block 304, prefetch queue 202 includes one (or more) frozen slots. It should be appreciated that the two control instructions need not be present within pipeline 106 concurrently.

In block 314, prefetch queue 202 outputs the data stored in the frozen first slot. For example, in response to the notification of block 312, select circuit 206 instructs multiplexer 212, via select signal 216, to output the program counter value and the instruction stored in the frozen first slot. For purposes of description, the program counter value and instruction stored in the frozen first slot may be referred to within this disclosure as the frozen program counter value and the frozen instruction. The frozen program counter value and the frozen instruction are output to the pipeline 106. It should be appreciated that the frozen program counter value is the target program counter value from the control instruction detected in block 304.

Figure 4D:
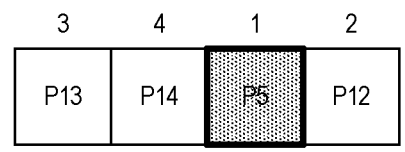

In FIG. 4D, the contents of the frozen first slot again remain unchanged. Slot 1 continues to store P5. The contents of the unfrozen slots 2, 3, and 4 store new data in the form of data pairs P12, P13, and P14. In the case where a second control instruction is detected, select circuit 206 outputs the contents of the frozen first slot. Accordingly, data pair P5 is output from prefetch queue 202.

In block 316, the frozen program counter value is compared with a target program counter value. For example, comparator circuit 208 is capable of comparing the frozen program counter value with the target program counter value to determine a match. As discussed, the target program counter value may be provided to PQ architecture 104 from pipeline 106. The target program counter value used for the comparison in block 316 is the target address calculated by pipeline 106 as determined from the (second) control instruction of block 312.

In block 318, a determination is made as to whether the target program counter value matches the frozen program counter value. In response to determining that the target program counter value matches the frozen program counter value, method 300 continues to block 320. In response to determining that the target program counter value does not match the frozen program counter value, method 300 continues to block 324.

In block 320, in response to comparator circuit 208 determining that the target program counter value matches the frozen program counter value, comparator circuit 208 is capable of notifying select circuit 206 of the match via signal 218. In response to being notified of the match, select circuit 206 is capable of notifying pipeline 106 that the data output from prefetch queue 202 is valid. For example, select circuit 206 is capable of asserting valid signal 226 to pipeline 106 thereby indicating that the data output from the frozen first slot is valid data. Pipeline 106, for example, may not allow the frozen instruction and/or frozen program counter value to enter without receiving a valid indication from select circuit 206. Further, in block 320, the frozen first slot remains frozen.

In block 322, the prefetch queue 202 continues to operate with the first slot frozen. That is, write circuit 204 may continue to fetch enough data to fill N−1 slots and write such data to only the unfrozen slots (e.g., slots 2, 3, and 4). It should be appreciated that concurrently with providing the frozen program counter value and/or the frozen instruction to pipeline 106, write circuit 204 fetches new data into the unfrozen slots 214 of prefetch queue 202. Accordingly, on a next clock cycle, prefetch queue 202 is capable of supplying further program counter values and instructions continuing from the target of the control instruction thereby avoiding a stall in pipeline 106. As noted, select circuit 206 only provides the contents of the frozen first slot from multiplexer 212 in response to detection of control instructions entering pipeline 106. In other cases, content from non-frozen slots is output. After block 322, method 300 may loop back to block 312 to continue operation.

Figure 4E:
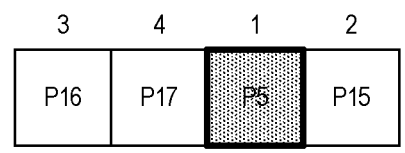

FIG. 4E is illustrative of an example state of prefetch queue 202 following block 322. As shown, the frozen first slot again remains unchanged. Slot 1 continues to store data pair P5. The contents of the unfrozen slots 2, 3, and 4 store new data in the form of data pairs P15, P16, and P17. In the case where a second control instruction is detected as described in the example of block 312, select circuit 206 outputs the contents of the frozen first slot. Accordingly, P5 is output from prefetch queue 202.

In block 324, in response to comparator circuit 208 determining that the target program counter value does not match the frozen program counter value, comparator circuit 208 is capable of notifying select circuit 206 of the mismatch via signal 218. In response to being notified of the mismatch, select circuit 206 is capable of notifying pipeline 106 that the data output from prefetch queue 202 is invalid. For example, select circuit 206 is capable of de-asserting valid signal 226 to pipeline 106 thereby indicating that the data output from the frozen first slot is invalid data. The frozen program counter value does not match the target program counter value. In that case, pipeline 106 does not allow the frozen instruction and/or frozen program counter value to enter. The data is rejected by pipeline 106.

Further, in block 324, the first slot is unfrozen. Select circuit 206 is capable of unfreezing the first slot. Select circuit 206 may indicate that the first slot has been unfrozen to write circuit 204 by way of signal 228. Continuing with block 326, the prefetch queue continues operation with the first slot unfrozen. That is, write circuit 204 may continue to fetch enough data to fill N slots and write such data to only the unfrozen slots, which in this case is all slots of prefetch queue 202. Following block 326, method 300 may loop back to block 304 to continue operation.

Figure 4F:
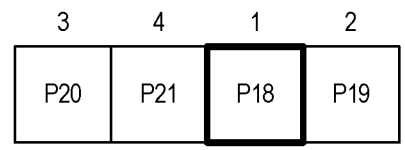

FIG. 4F illustrates an example state of prefetch queue 202 following block 326. As shown, the first slot is unfrozen. Further, write circuit 204 has fetched N different data pairs P18, P19, P20, and P21, that have been written to slots 1, 2, 3, and 4, respectively.

FIGS. 2-4, taken collectively, illustrate how the first slot of prefetch queue 202 may be frozen following a data fetch performed responsive to a control instruction. Freezing the first slot following the data fetch as described ensures that the target program counter value for the control instruction is preserved in cases where the processor loops. Thus, each time the processor loops, the instruction corresponding to the target program counter value may be fed to pipeline 106 to avoid a pipeline stall.

While the examples described within this disclosure freeze and unfreeze the first slot of a prefetch queue, in other example implementations, more than one slot may be frozen. With freezing more than one slot, the architecture may be further modified to include additional comparator circuits. For example, for each slot that may be frozen in such an architecture, an additional comparator circuit may be added.

Figure 5:
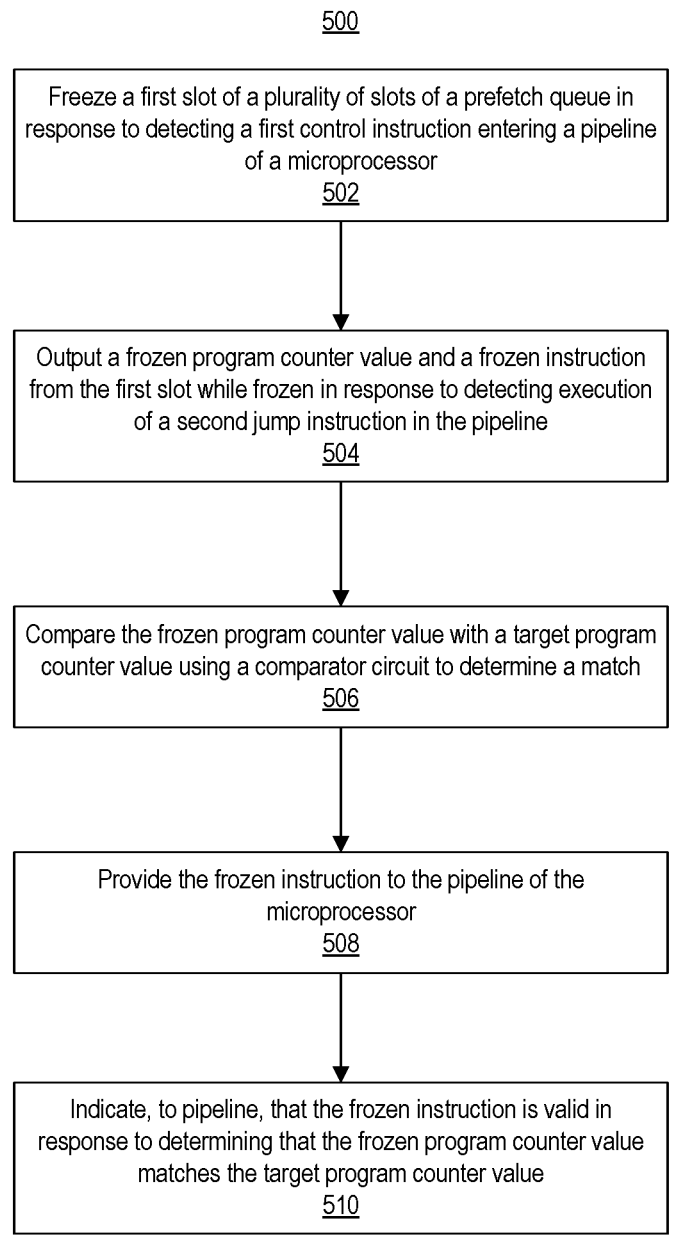
FIG. 5 is a method illustrating certain operative features of the prefetch queue architecture of FIGS. 1 and 2.

FIG. 5 is a method 500 illustrating certain operative features of the PQ architecture 104 of FIGS. 1 and 2. In block 502, a first slot of a plurality of slots of the prefetch queue 202 is frozen in response to detecting entry of a first control instruction into a pipeline 106 of microprocessor 102. For example, select circuit 206 is capable of freezing the first slot in response to receiving a notification that the first control instruction is entering or has entered the pipeline 106.

In block 504, a frozen program counter value and a frozen instruction are output from the first slot, while frozen, in response to detecting entry of a second control instruction into the pipeline. For example, select circuit 206, in response to receiving a further notification as described that a subsequent control instruction has entered or is entering the pipeline 106, is capable of instructing multiplexer 212 to output the contents or data pair (e.g., the frozen program counter value and the frozen instruction) of the frozen first slot.

In block 506, the frozen program counter value is compared with a target program counter value using a comparator circuit to determine a match. Comparator circuit 208 is capable of comparing the program counter value output from the frozen first slot with the target program counter value received from pipeline 106. Comparator circuit 208 determines whether, based on the comparison, the program counter value output from the frozen first slot matches the target program counter value.

In block 508, the frozen instruction may be provided to a pipeline of the microprocessor. For example, the frozen instruction, as output by multiplexer 212, is provided to pipeline 106. In block 510, an indication may be provided to the pipeline 106 of the microprocessor 102 that the frozen instruction is valid in response to determining that the frozen instruction matches a target program counter value. Comparator circuit 208, for example, indicates to select circuit 206 via signal 218 that the frozen program counter value matches the target program counter value. In response, select circuit 206 indicates that the frozen instruction provided to pipeline 106 is valid via signal 226. Pipeline 106, in response to the indication that the frozen instruction is valid, admits the instruction into the pipeline 106.

The foregoing and other implementations can each optionally include one or more of the following features, alone or in combination. Some example implementations include all the following features in combination.

The method can include fetching new data into prefetch queue 202 concurrently with the outputting the frozen program counter value and the frozen instruction from the first slot while frozen. That is, write circuit 204 may operate to continue to fetch new data into unfrozen slots of memory 210 while prefetch queue 202 operates and outputs data under control of select circuit 206.

As discussed, only unfrozen slots of the plurality of slots are overwritten with new data in response to fetching the new data into the prefetch queue. Select circuit 206, for example, is capable of indicating to write circuit 204, via signal 228, which slots are frozen at any given time. Write circuit 204 is capable of writing newly fetched data only into the slots of prefetch queue 202 that are not frozen.

The method can include unfreezing the first slot frozen in response to a mismatch between the target program counter value and the frozen program counter value. For example, in the case where the contents of the frozen first slot are output (e.g., block 314 and/or 504), and the frozen program counter value does not match the target program counter, as determined by comparator circuit 208, comparator circuit 208 indicates the mismatch to select circuit 206. In response, select circuit 206 unfreezes the first slot. Once unfrozen, write circuit 204 may write newly fetched data into the first slot along with any other slots that are not frozen.

Figure 6:
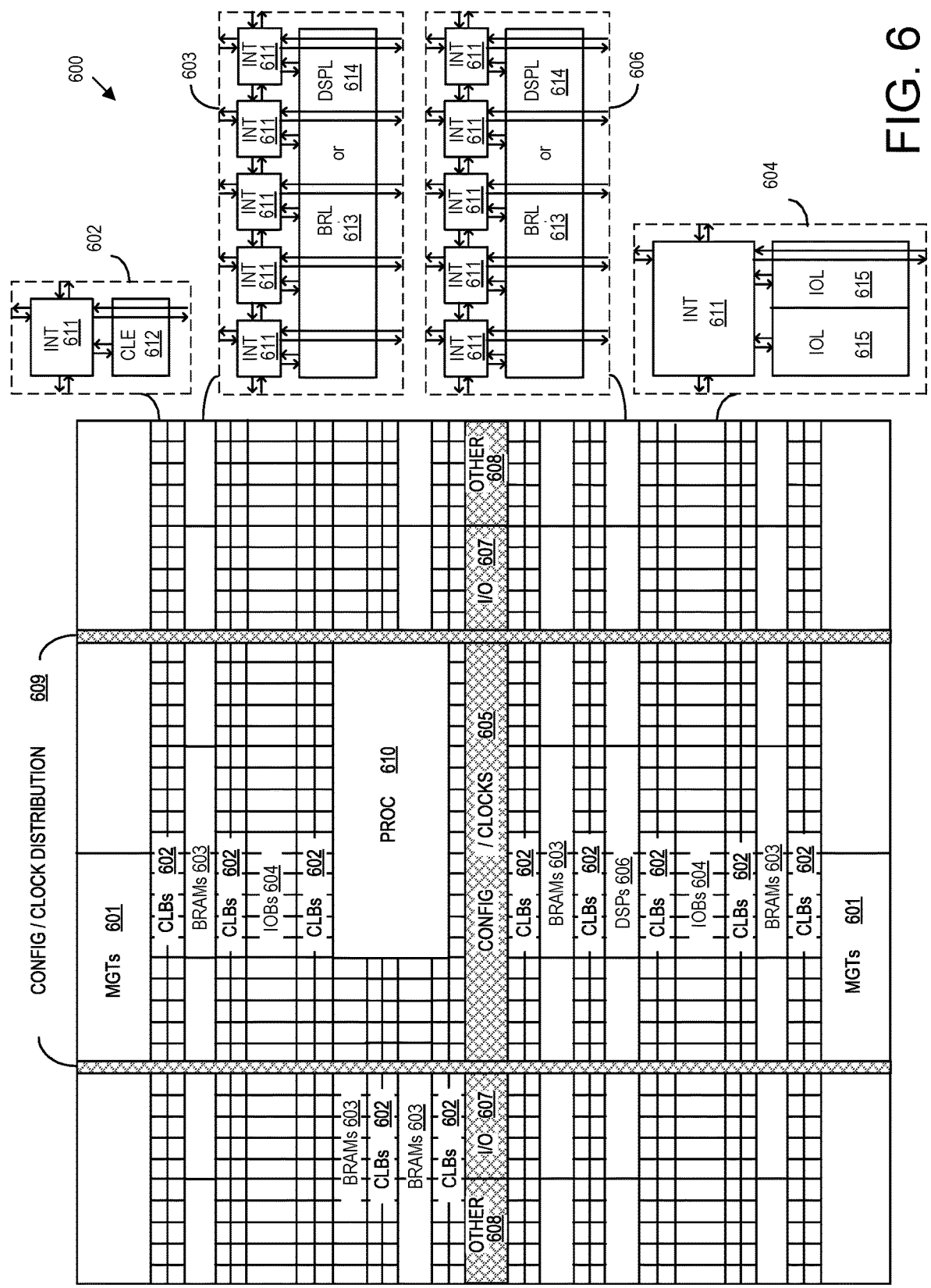
FIG. 6 illustrates an example architecture for an integrated circuit that may include or implement a microprocessor in accordance with the inventive arrangements described herein.

FIG. 6 illustrates an example architecture 600 for an IC. In one aspect, architecture 600 may be implemented within a programmable IC. For example, architecture 600 may be used to implement a field programmable gate array (FPGA). Architecture 600 may also be representative of a system-on-chip (SoC) type of IC. An SoC is an IC that includes a processor that executes program code and one or more other circuits. The other circuits may be implemented as hard-wired circuitry, programmable circuitry, and/or a combination thereof. The circuits may operate cooperatively with one another and/or with the processor.

As shown, architecture 600 includes several different types of programmable circuit, e.g., logic, blocks. For example, architecture 600 may include a large number of different programmable tiles including multi-gigabit transceivers (MGTs) 601, configurable logic blocks (CLBs) 602, random-access memory blocks (BRAMs) 603, input/output blocks (IOBs) 604, configuration and clocking logic (CON-FIG/CLOCKS) 605, digital signal processing blocks (DSPs) 606, specialized I/O blocks 607 (e.g., configuration ports and clock ports), and other programmable logic 608 such as digital clock managers, analog-to-digital converters, system monitoring logic, and so forth.

In some ICs, each programmable tile includes a programmable interconnect element (INT) 611 having standardized connections to and from a corresponding INT 611 in each adjacent tile. Therefore, INTs 611, taken together, implement the programmable interconnect structure for the illustrated IC. Each INT 611 also includes the connections to and from the programmable logic element within the same tile, as shown by the examples included at the right of FIG. 6.

For example, a CLB 602 may include a configurable logic element (CLE) 612 that may be programmed to implement user logic plus a single INT 611. A BRAM 603 may include a BRAM logic element (BRL) 613 in addition to one or more INTs 611. Typically, the number of INTs 611 included in a tile depends on the height of the tile. As pictured, a BRAM tile has the same height as five CLBs, but other numbers (e.g., four) also may be used. A DSP tile 606 may include a DSP logic element (DSPL) 614 in addition to an appropriate number of INTs 611. An 10B 604 may include, for example, two instances of an I/O logic element (IOL) 615 in addition to one instance of an INT 611. The actual I/O pads connected to IOL 615 may not be confined to the area of IOL 615.

In the example pictured in FIG. 6, the shaded area near the center of the die, e.g., formed of regions 605, 607, and 608, may be used for configuration, clock, and other control logic. Shaded areas 609 may be used to distribute the clocks and configuration signals across the breadth of the programmable IC.

Some ICs utilizing the architecture illustrated in FIG. 6 include additional logic blocks that disrupt the regular columnar structure making up a large part of the IC. The additional logic blocks may be programmable blocks and/or dedicated circuitry. For example, a processor block depicted as PROC 610 spans several columns of CLBs and BRAMs. PROC 610 is an example of microprocessor 102 as described herein.

As such, PROC 610 may be implemented to include a PQ architecture 104 as described herein. FIG. 6 illustrates an example where a microprocessor (e.g., PROC 610) is embedded in an IC. In the example of FIG. 6, the IC includes programmable logic. PROC 610, for example, may be implemented using a RISC ISA. PROC 610 further may be implemented as a single-issue pipeline microprocessor.

In one aspect, PROC 610 may be implemented as dedicated circuitry, e.g., as a hardwired processor, that is fabricated as part of the die that implements the programmable circuitry of the IC. PROC 610 may represent any of a variety of different processor types and/or systems ranging in complexity from an individual processor, e.g., a single core capable of executing program code, to an entire processor system having one or more cores, modules, co-processors, interfaces, or the like. Still, PROC 610 and/or cores thereof are implemented using the RISC ISA and as a single-issue pipeline type of processor.

In another aspect, PROC 610 may be omitted from architecture 600 and replaced with one or more of the other varieties of the programmable blocks described. Further, such blocks may be utilized to form a "soft processor" in that the various blocks of programmable circuitry may be used to form a processor that can execute program code as is the case with PROC 610. 17. In that case, PROC 610, being implemented programmable logic of the IC, still may be implemented using a RISC ISA and as a single-issue pipeline type of processor.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 6 that are external to PROC 610 such as CLBs 602 and BRAMs 603 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 610.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 610 or a soft processor. In some cases, architecture 600 includes a dedicated configuration processor that loads the configuration bitstream to the appropriate configuration memory and/or processor memory. The dedicated configuration processor does not execute user-specified program code. In other cases, architecture 600 may utilize PROC 610 to receive the configuration bitstream, load the configuration bitstream into appropriate configuration memory, and/or extract program code for execution.

FIG. 6 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 6 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 610 within the IC are for purposes of illustration only and are not intended as limitations.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" and "microprocessor" mean at least one circuit capable of carrying out instructions contained in program code. The circuit may be an integrated circuit or embedded in an integrated circuit.

As defined herein, the term "soft" in reference to a circuit means that the circuit is implemented in programmable logic or programmable circuitry. Thus, a "soft processor" means at least one circuit implemented in programmable circuitry that is capable of carrying out instructions contained in program code.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The flowcharts and block diagrams in the Figures illustrate the architecture, functionality, and operation of possible implementations of systems and methods according to various aspects of the inventive arrangements. In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A system including a microprocessor, the microprocessor comprising:

a prefetch queue including a plurality of slots, wherein the plurality of slots are configured to store program counter values and instructions;

a pipeline configured to receive instructions from the prefetch queue;

a select circuit coupled to the prefetch queue, wherein the select circuit is configured to freeze a first slot of the plurality of slots in response to a first control instruction entering the pipeline and, in response to a second control instruction entering the pipeline, output to the pipeline a frozen instruction and a frozen program counter value for the first instruction stored in the first slot while the first slot is frozen;

write logic coupled to the prefetch queue, wherein the write logic is configured to load program counter values and instructions into unfrozen slots of the prefetch queue; and a comparator circuit coupled to the prefetch queue and the select circuit, wherein the comparator circuit is configured to compare a target program counter value corresponding to the second control instruction with the frozen program counter value as output from the first slot of the prefetch queue to determine a match;

wherein the select circuit provides a valid signal to the pipeline indicating whether the frozen instruction provided to the pipeline is valid based on whether the target program counter value matches the frozen program counter value.

2. The system of claim 1, wherein the first slot is initially unfrozen, the select circuit is configured to freeze the first slot of the plurality of slots in response to detecting entry of the first control instruction into the pipeline.

3. The system of claim 2, wherein, while the first slot is frozen, for each control instruction entering the pipeline following the first control instruction, the frozen instruction is provided to the pipeline and the valid signal indicates whether the frozen instruction is valid based on a comparison of the frozen program counter value with a program counter value of the respective control instruction entering the pipeline.

4. The system of claim 3, wherein the select circuit unfreezes the first slot in response to a mismatch between the target program counter value and the frozen program counter value.

5. The system of claim 1, wherein the microprocessor is embedded in an integrated circuit.

6. The system of claim 1, wherein the microprocessor is embedded in an integrated circuit that includes programmable logic.

7. The system of claim 1, wherein the microprocessor is implemented using programmable logic of an integrated circuit.

8. The system of claim 1, wherein an Instruction Set Architecture of the microprocessor is a Reduced Instruction Set Computer.

9. The system of claim 1, wherein the microprocessor is a single-issue pipeline microprocessor.

10. The system of claim 1, wherein the prefetch queue includes a multiplexer configured to output at least an instruction from a slot selected from the plurality of slots by the select circuit.

11. A method, comprising:
freezing a first slot of a plurality of slots of a prefetch queue in response to detecting entry of a first control instruction into a pipeline of a microprocessor, wherein the first slot stores a frozen instruction and a frozen program counter value for the frozen instruction;
outputting to the pipeline the frozen instruction and the frozen program counter value from the first slot while frozen in response to detecting entry of a second control instruction into the pipeline;
subsequent to the outputting, comparing the frozen program counter value, as output from the first slot of the prefetch queue, with a target program counter value corresponding to the second control instruction using a comparator circuit to determine a match; and
indicating to the pipeline that the frozen instruction is valid in response to determining that the frozen instruction matches the target program counter value.

12. The method of claim 11, comprising:
fetching new data into the prefetch queue concurrently with the outputting the frozen instruction and the frozen program counter value from the first slot while frozen.

13. The method of claim 11, wherein only unfrozen slots of the plurality of slots are overwritten with new data.

14. The method of claim 11, comprising:
unfreezing the first slot in response to a mismatch between the target program counter value and the frozen program counter value.

15. The method of claim 11, wherein the microprocessor is embedded in an integrated circuit.

16. The method of claim 11, wherein the microprocessor is embedded in an integrated circuit that includes programmable logic.

17. The method of claim 11, wherein the microprocessor is implemented using programmable logic of an integrated circuit.

18. The method of claim 11, wherein an Instruction Set Architecture of the microprocessor is a Reduced Instruction Set Computer.

19. The method of claim 11, wherein the microprocessor is a single-issue pipeline microprocessor.

20. The method of claim 11, wherein the prefetch queue includes a multiplexer configured to output at least an instruction from a slot selected from the plurality of slots.

* * * * *